(12) United States Patent
Uyttendaele et al.

(10) Patent No.: US 7,583,288 B2
(45) Date of Patent: Sep. 1, 2009

(54) PANORAMIC VIDEO

(75) Inventors: Matthew Uyttendaele, Seattle, WA (US); Richard Szeliski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 10/869,020

(22) Filed: Jun. 15, 2004

(65) Prior Publication Data
US 2004/0233274 A1 Nov. 25, 2004

Related U.S. Application Data

(63) Continuation of application No. 09/611,646, filed on Jul. 7, 2000, now Pat. No. 6,788,333.

(51) Int. Cl.
*H04N 7/00* (2006.01)
(52) U.S. Cl. ....................................................... 348/36
(58) Field of Classification Search .................. 348/42, 348/46, 92, 143, 722, 36, 240.16, 240.01; 345/419, 634; 382/294, 154, 152, 284; *H04N 7/00*
See application file for complete search history.

(56) References Cited

U.S. PATENT DOCUMENTS

| | | | | |
|---|---|---|---|---|
| 5,495,576 A * | 2/1996 | Ritchey | ...................... | 345/420 |
| 5,757,424 A * | 5/1998 | Frederick | .................. | 348/218.1 |
| 5,850,352 A * | 12/1998 | Moezzi et al. | ............... | 345/419 |
| 5,963,664 A * | 10/1999 | Kumar et al. | ................ | 382/154 |
| 5,986,668 A * | 11/1999 | Szeliski et al. | ............... | 345/634 |
| 6,075,905 A * | 6/2000 | Herman et al. | ............... | 382/284 |
| 6,307,959 B1 * | 10/2001 | Mandelbaum et al. | ...... | 382/154 |
| 6,317,166 B1 * | 11/2001 | McCutchen | .................. | 348/722 |
| 6,323,858 B1 * | 11/2001 | Gilbert et al. | ............... | 345/419 |
| 6,393,163 B1 * | 5/2002 | Burt et al. | .................... | 382/294 |
| 6,473,118 B1 * | 10/2002 | Morrow | ..................... | 348/143 |
| 6,522,787 B1 * | 2/2003 | Kumar et al. | ............... | 382/268 |
| 6,665,003 B1 * | 12/2003 | Peleg et al. | .................... | 348/36 |
| 6,750,873 B1 * | 6/2004 | Bernardini et al. | .......... | 345/582 |

* cited by examiner

*Primary Examiner*—Tung Vo
(74) *Attorney, Agent, or Firm*—Lyon & Harr, LLP; Richard T. Lyon

(57) ABSTRACT

A system and process for generating a panoramic video. Essentially, the panoramic video is created by first acquiring multiple videos of the scene being depicted. Preferably, these videos collectively depict a full 360 degree view of the surrounding scene and are captured using a multiple camera rig. The acquisition phase also includes a calibration procedure that provides information about the camera rig used to capture the videos that is used in the next phase for creating the panoramic video. This next phase, which is referred to as the authoring phase, involves mosaicing or stitching individual frames of the videos, which were captured at approximately the same moment in time, to form each frame of the panoramic video. A series of texture maps are then constructed for each frame of the panoramic video. Each texture map coincides with a portion of a prescribed environment model of the scene. The texture map representations of each frame of the panoramic video are encoded so as to facilitate their transfer and viewing. This can include compressing the panoramic video frames Such a procedure is useful in applications where the panoramic video is to be transferred over a network, such as the Internet.

45 Claims, 11 Drawing Sheets

PANORAMIC VIDEO

CROSS-REFERENCE TO RELATED APPLICATIONS

This application is a continuation of a prior application entitled "PANORAMIC VIDEO" which was assigned Ser. No. 09/611,646 and filed Jul. 7, 2000 now U.S. Pat. No. 6,788,333.

BACKGROUND

1. Technical Field

The invention is related to a system and process for generating a panoramic video of a scene, and more particularly to such a system and process that employs a multi-camera rig to capture individual videos that collectively depict the surrounding scene, and which are then stitched together on a frame by frame basis to form the frames of the panoramic video.

2. Background Art

A panoramic video is a video made up of a sequence of panoramic frames depicting a surrounding scene. Ideally, the panoramic video makes available a seamless, 360 degree, view of this scene. In this way, a person viewing the panoramic video can select different portions of the scene to view on a real-time basis. In other words, a person viewing the panoramic video on the proper viewer can electronically steer his or her way around in the scene as the video is playing.

A number of different systems for generating panoramic videos have been previously developed. For the most part, these systems employ a mirror arrangement to capture the surrounding scene. For example, one existing system, referred to as a catadioptric omnidirectional camera system, incorporates mirrors to enhance the field of view of a single camera. Essentially, this system, which is described in a technical report entitled "Catadioptric Omnidirectional Camera" (Shree K. Nayar, Proc. of IEEE Conference on Computer Vision and Pattern Recognition, Puerto Rico, June 1997), uses a camera that images a hemispherical mirror to generate a panoramic still image with a 360°×210° field of view. Another similar mirror-based system unwarps a spherically distorted video produced by the mirror-and-camera rig into a rectangular video stream then encodes it using standard streaming authoring tools. The person viewing a video produced via this system sees a sub-region of the scene captured in the panoramic video and can pan within the scene. While these mirror-based single camera systems are capable of producing convincing panoramic stills and video, they suffer from a relatively low resolution and a fairly complex camera rig owing to the mirror arrangements.

Another current panoramic video system that attempts to overcome the resolution and complexity problems, foregoes the use of a mirror, and employs a multiple camera head instead. The head consists of six cameras mounted on the six faces of a 2-inch cube, resulting in a 360°×360° field of view. The system also provides post-processing software to stitch the video streams from the individual cameras into a panorama. This multi-camera system has higher resolution than the catadioptric systems described above, but has the disadvantage of an expensive stitching stage and parallax artifacts due to the cameras not sharing a common center of projection.

One other system of note employs both a mirror arrangement and multiple cameras in an attempt to achieve a higher resolution without the stitching and parallax problems of the non-catadioptric, multi-camera system just described. Essentially, this system uses the mirror arrangement to create a common effective viewpoint for the cameras. While this system improves the resolution and reduces the aforementioned stitching and parallax problems, it still requires the use of a complex mirror-and-camera rig.

The present invention is directed at a non-catadioptric, multi-camera system and process that is capable of providing high resolution panoramic video, minimal stitching and parallax problems and a relatively simple camera rig.

SUMMARY

The present invention involves a system and process for creating a panoramic video. Essentially, the creation of a panoramic video in accordance with the present invention first entails acquiring multiple videos of the scene being depicted. Preferably, these videos collectively depict a full 360 degree view of the surrounding scene. The acquisition phase also includes a calibration procedure that provides information about the camera rig used to capture the videos that is used in the next phase for creating the panoramic video. This next phase, which is referred to as the authoring phase, involves mosaicing or stitching the individual videos together to form a single panoramic video. In addition the authoring phase can include an encoding procedure, which may involve compressing the panoramic video. Such a procedure is useful in applications where the panoramic video is to be transferred over a network, such as the Internet.

A specialized camera rig is employed in the acquisition phase to capture a series of videos of the scene. The camera rig preferably consists of multiple digital video cameras that are disposed in a back to back fashion such that their lenses each point in a radially outward direction and view a different portion of the surrounding scene. The cameras are mounted on a surface, which for calibration purposes is capable of being rotated 360 degrees. Ideally, the cameras would be mounted such that their optical axes are coplanar and intersect at a common point coinciding with the axis of rotation of the mounting surface. While it is desired to come as close to these ideal mounting conditions as possible, any misalignment will be identified as part of the calibration procedure and corrected during the generation of the panoramic video.

The number of cameras used will depend on their field of view characteristics. The procedures used in the aforementioned authoring phase will work best if the lateral field of view of each camera overlaps by at least 20 percent. Thus, at least as many cameras as needed to provide a full 360 degree coverage of the scene including the desired overlaps would be employed. It is noted, however, that to minimize the cost of the camera rig and to reduce the processing and memory requirements of the present panoramic video system, it is preferred to use as few cameras as possible without significantly degrading the resolution of the resulting panoramic video. In this regard, if the foregoing field of view overlap cannot be achieved using a reasonable number of cameras with a standard lens arrangement, it is permissible to employ wide angle lenses. For the most part, distortion introduced by the wide angle lenses will be identified by the calibration procedure and can also be corrected during the generation of the panoramic video.

While any digital video camera can be employed in the camera rig, it is preferred that the cameras be capable of recording in a progressive scan mode at 30 frames per second (i.e., a mode in which each raster line is sampled to produce each frame of the video, rather than every other line as is the standard recording mode of most video cameras). This mode is preferred as it is the typical mode for display on a conventional PC monitor, and it is envisioned that the panoramic video will primarily be viewed on a PC monitor. Image frames captured in this mode are also easier to stitch together to form a panoramic frame. In addition, each of the cameras should be adjusted to have as near as possible the same settings. For example, it is preferred that each camera be set to the same zoom, focus, exposure and shutter speed, as well as being white balanced in the same way and having any image stabilization feature turned off.

The camera rig is calibrated prior to being used to capture a panoramic video. The first part of the calibration procedure involves producing a calibration video with one of the cameras. This is accomplished by setting the selected camera to record and rotating the camera rig 360 degrees in the same direction. The video output from the camera during the recording sweep is stored as a video file (e.g., an .avi file). In one preferred embodiment of the calibration procedure, the next process action involves holding the camera rig stationary while capturing a single image frame with each of the cameras. These calibration images are also stored in memory. The images could also be obtained in other ways. For example, all the cameras could be set to record during the aforementioned 360 degree sweep and the resulting videos stored. In this case, the required calibration images would be taken from each of the videos by, for example, extracting an image frame from each video that was captured at approximately the same moment, or when the rig was stationary.

The calibration video will contain many more frames than are necessary to produce the panoramic image of the surrounding scene that will be used in the calibration procedure. To this end, it is preferred to extract only those frames that are needed from the calibration video. This can be accomplished by selecting just enough of the video's frames needed to depict every part of the surrounding scene with an overlap between frames of about one-half to three-quarters.

Inaccuracies in the structure or alignment of the camera lenses can cause the images taken by the respective cameras to have different image centers. This is particularly true if wide angle lenses are employed. Thus, it is preferred that a centering action be performed at this point in the calibration procedure. Any conventional process capable of shifting the selected frames so as to exhibit a common pixel location for the center of each image can be employed for this purpose.

The next action in the calibration procedure involves mosaicing or "stitching together" the individual selected frames into a single panoramic image of the surrounding scene and determining the focal length and radial distortion associated with the video camera used to capture the calibration video. While any existing mosaicing process can be employed for this purpose, it is preferred that it be accomplished using the methods taught in U.S. Pat. No. 6,018,349 entitled "Patch Based Alignment Method and Apparatus For Construction of Image Mosaics".

Each of the previously captured calibration images from each camera are next stitched into the panoramic image. Here again it is preferred that the process described in U.S. Pat. No. 6,018,349 be used to accomplish this task. A by-product of this stitching process will be the rotation matrices for each camera. These matrices along with the previously computed focal length and radial distortion estimates are associated with each camera and stored for future use.

It is optionally possible to perform a block adjustment procedure at this point in the calibration to refine the estimates for the focal length and rotation matrices. Preferably, the block adjustment procedure described in U.S. Pat. No. 5,987,164 entitled "Block Adjustment Method and Apparatus for Construction of Image Mosaics" is employed for this purpose.

The frames of the calibration video used to create the original panoramic image are next deleted, thereby leaving just the calibration images captured by the cameras. These images form a panoramic image that will be referred to as the calibration panoramic image.

The aforementioned block adjustment procedure is in essence a global alignment of the images making up the panoramic image. However, there can still be localized mis-registrations present in the calibration panoramic image that can appear as double images (ghosting) or blurring. One way such distortions can occur derives from the fact that the mosaicing process assumes an idealized camera model. However, in actuality un-modeled radial distortion (i.e., that component of the radial distortion that cannot be adequately modeled in the mosaicing process), tangential distortion, and non-square pixel distortion, among others can cause the local mis-registrations. Further, in regard to the aforementioned calibration images making up the calibration panoramic image, these images were captured by the respective cameras from different viewpoints. While this is irrelevant for objects in the scene that are far away from the cameras, objects that are closer in can create a double image in the panorama. This is referred to as parallax distortion. In the context of the calibration panorama, a close-in object depicted in two of the calibration images captured by adjacent cameras will result in a double image in the overlap region of these images in calibration panoramic image. To compensate for these localized distortions, an estimate of the amount of local mis-registration can be computed and then each image in the panorama can be locally warped to reduce any ghosting or blurring. Preferably, this is accomplished using the procedures described in U.S. Pat. No. 5,986,668 entitled "Deghosting Method and Apparatus for Construction of Image Mosaics".

Finally, the "distortion-corrected" calibration panoramic image is optionally saved, along with the previously computed focal length and radial distortion estimates, rotation matrices for each camera, and the deghosting correction field, in a calibration file. It is noted that the inclusion of the calibration panoramic image is optional since it is not actually used in the creation of a panoramic video as are the other items constituting the calibration file. These other items are used in the mosaicing process to correct for distortions in the frames of the panoramic video. However, the calibration panoramic image does provide a visual indication of the accuracy of the calibration process, and so can be included for that purpose. It is noted that any time the camera rig or the camera parameters are adjusted, it is necessary to repeat the calibration procedure to produce a new calibration file before authoring a panoramic video.

The panoramic video is generated by first capturing videos of the surrounding scene using the cameras of the previously-described camera rig. Ideally, the cameras would have a synchronization feature by which each camera can be started at the same instant. In this way, the frame numbers of the frames captured by each camera will correspond. For example, the first frame captured by each camera will have been captured at approximately the same time, the second frame captured by each camera would have been captured at approximately the same time, and so on. It is important to know which frames where captured by the cameras at the same time because these corresponding frames will be stitched together into a panoramic image that will form one of the frames of the panoramic video. However, if the cameras do not possess a synchronization feature, an alternate procedure can be performed to find the frames captured by the cameras at the same time. In essence, the procedure involves recording a synchronizing event at the beginning of the recording process and using it to find the corresponding frames. Specifically, all the cameras in the camera rig are set to the record mode. Preferably, the synchronizing event involves bringing an object simultaneously into the view of each pair of adjacent cameras, in turn, or performing some action in the view of each adjacent pair of cameras, in turn. For example, a clapboard could be used for this purpose. The recording of the scene then continues until enough video is captured to produce the desired length panoramic video. It is noted that the scene need not be static during this recording, unlike the recording phase of the calibration procedure. The video captured by each file would be stored as a separate file (e.g., as an .avi file).

While the above-described synchronizing method is preferred, other methods can be employed. For example, an object could be simultaneously brought into view of all the cameras at the same time. This might be accomplished by raising a box or ring up into the field of view of the cameras. However, it is noted that because each camera must "see" the object simultaneously, this could be a difficult task. Another synchronizing method that could be employed would be to suddenly change the illumination in the environment to a noticeable degree. This has the advantage that all the cameras would "see" this event at the same time. Of course, this last method is only appropriate for indoor environments where control of the illumination is feasible.

Once the videos that are to be made into the panoramic video have been captured, the frame number in each video that coincides with the recorded synchronization event (if present) is identified. In other words, the frame number of the frame in which the synchronization object first appears, or when the synchronization action is performed (e.g., the clap of the clapboard), in each video, would be identified. The relative frame number offsets among the cameras is then computed. Once the frame offsets have been computed, the panoramic frames of the video are generated. This is done by selecting a starting frame from one of the videos. The previously computed offsets are then used to identify the corresponding frame in each of the other videos that was captured at approximately the same moment as the selected starting frame. The first frames identified in each video via the foregoing procedure are then stitched together, preferably using the aforementioned mosaicing process of U.S. Pat. No. 6,018,349, and the parameters saved in the calibration file (i.e., the focal length and radial distortion estimates, the rotation matrices for each camera, and the deghosting correction field). This same process is then repeated for the next consecutive frames in each video to produce each subsequent frame of the panoramic video, until the desired length panoramic video is produced, or there are no more frames left in any one of the videos.

It should be noted, however, that while the deghosting correction field provided in the calibration file will correct much of the camera related distortion, there may be objects close in to the cameras in the videos making up the panoramic video that would result in a double image (i.e., parallax distortion) in one or more of the panorama video frames. Granted, if the scene being recorded in the panoramic video is the same as the scene used to create the aforementioned calibration panoramic image, then some close in objects that are stationary in the scene may be compensated for by the deghosting correction field of the calibration file. However, a different scene may be involved in the panoramic video, and even in cases where the same scene is used, new close-in objects may be present that were not there during the calibration recording. Thus, it is advantageous to perform another deghosting procedure at this point in the panoramic video creation process. The preferred deghosting procedure is the same one described earlier and the subject of U.S. Pat. No. 5,986,668.

Further, it was stated earlier that each camera was to be set at the same exposure setting. However, this can be a difficult task, and it is possible that the video captured by one camera may have a somewhat different exposure level than the video captured by another of the cameras. If this is the case, then an optional exposure adjustment procedure could be applied to correct any mismatch between individual video image frames making up each of the panoramic video frames.

It is noted that the preferred mosaicing procedure results in each panoramic frame of the panoramic video being represented as the individual images plus associated transforms for each. This data must be converted into one of more images that can be readily viewed. Preferably, this is accomplished by using the individual images and associated transformations to construct a series of texture maps for each frame of the panoramic video based on a selected environment model. The shape of the environment model is left up to the author of the panoramic video. The preferred approach for constructing the texture maps is described in U.S. Pat. No. 6,009,190 entitled "Texture Map Construction Method and Apparatus for Displaying Panoramic Image Mosaics". The resulting texture maps are saved as one or more video files.

The foregoing procedure generates the video texture maps that will be used by a panoramic video viewer to play the panoramic video. The viewer will need certain information to play panoramic videos produced in accordance with the present procedures. Specifically, the viewer will first need the video data associated with the texture maps of the panoramic video frames, or at least a pointer as to where the data can be found or obtained. In addition, the viewer will need to know the shape of the environment model used to create the texture maps. Finally, the viewer should be informed of any navigation boundaries present in the data. For example, if just the panoramic video frames created from the videos captured by the previously described camera rig are provided in the files, then there would be no data associated with regions above and below the longitudinal field of view of the cameras. Thus, the navigation boundary information might describe the maximum up and down angle that the viewer can display to a user. Preferably, the aforementioned information is provided in a data file, which will be referred to for the purposes of the present invention as a .vvi file.

It should be noted in regard to the navigational boundaries, that any gaps in the data, such as the regions above and below the longitudinal field of view of the cameras in the previously-described camera rig, could be filled using static texture maps. This could be accomplished by, in addition to providing the data associated with each frame of the panoramic video, a static texture map (e.g., which could take the form in the .vvi file as a bitmap or pointer thereto) could be provided that would be used by the viewer as an addendum to all the panoramic video frames. For example, suppose the scene captured in the panoramic video was a room. The ceiling of the room would typically not change throughout the video. Therefore, a static image of the ceiling could be provided and displayed by the viewer, should the user want to pan up past the data provided by the panoramic video frames. Further, it should be noted that the present invention is not limited to the exemplary camera rig described earlier. Additional cameras could be added to capture the part of the scene above and below the longitudinal field of view of the cameras used in the exemplary rig. The videos captured by these cameras would be processed in the same way and included in the texture maps saved in the video data.

It may also be advantageous to compress the data associated with the panoramic video frames. While uncompressed data could be stored on a medium such as a hard drive, CD or DVD, it would be better to compress it if the files are intended to be transferred over a network (e.g., the Internet). It is also noted that an audio track could be added to the panoramic video which could be encoded into the data. The viewer would decode the audio and play it back in conjunction with playing each panoramic video frame. The audio itself could be captured using just one of the video cameras, or it could be a combined audio track composited from sound recorded by some or all the cameras. Further, each video camera in the camera rig could be used to record audio of the environment. The audio data recorded by each camera would be used to represent the environmental sounds that would be heard by a listener facing the portion of the scene contained within that camera's field of view. Audio data associated with each portion of the scene would be encoded into the texture map data files and assigned to the texture map data representing that portion. In conjunction with this latter embodiment, the panoramic video viewer employed to play the panoramic video would decode it and play back the particular audio assigned to the portion of the scene that is currently being viewed by a user of the system. If the portion of the scene being viewed by the user cuts across the regions captured by adjacent cameras of the camera rig, the viewer could blend the audio assigned to each region and play this composite audio in conjunction with the texture maps associated with that part of the scene.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
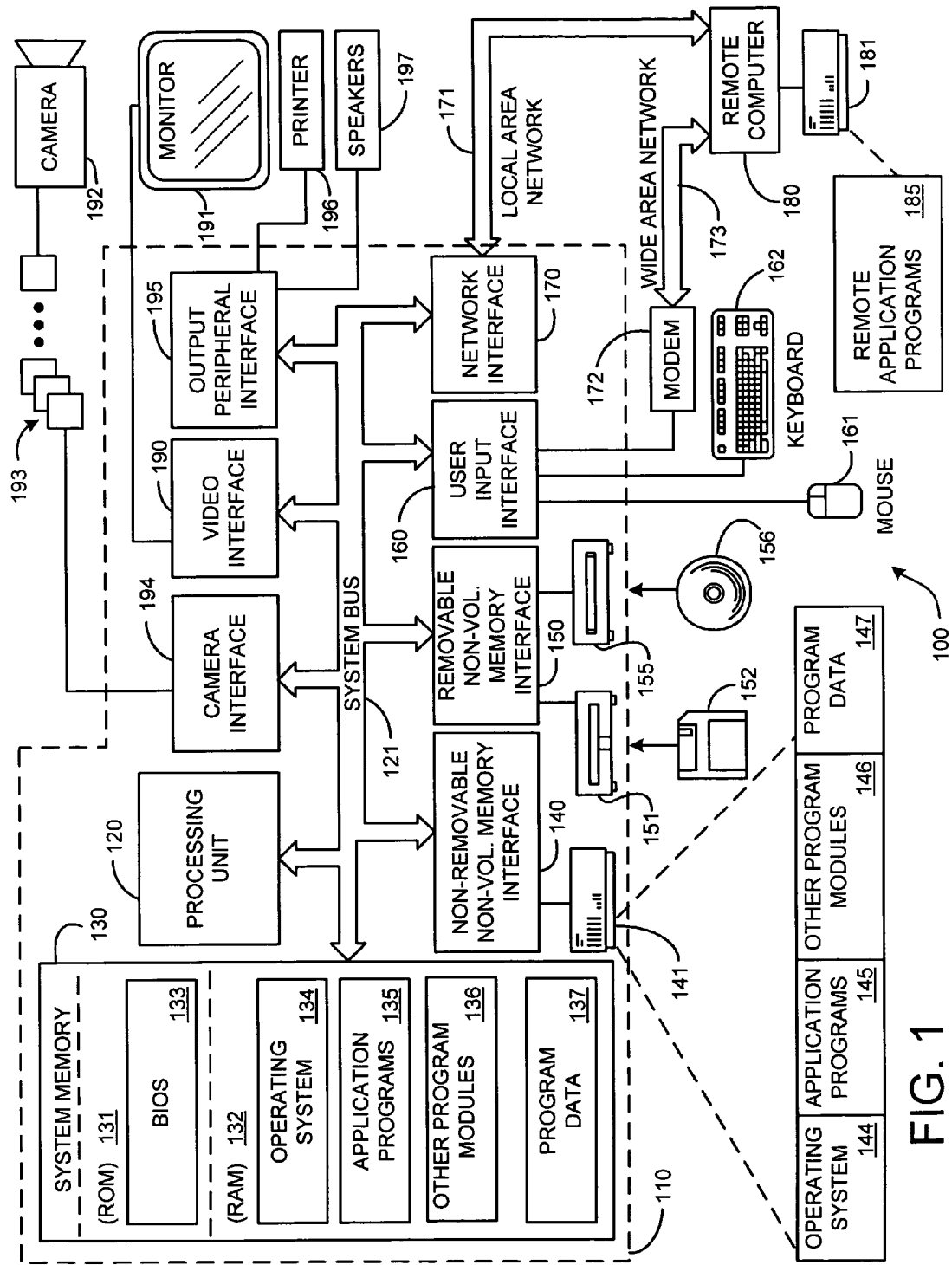
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
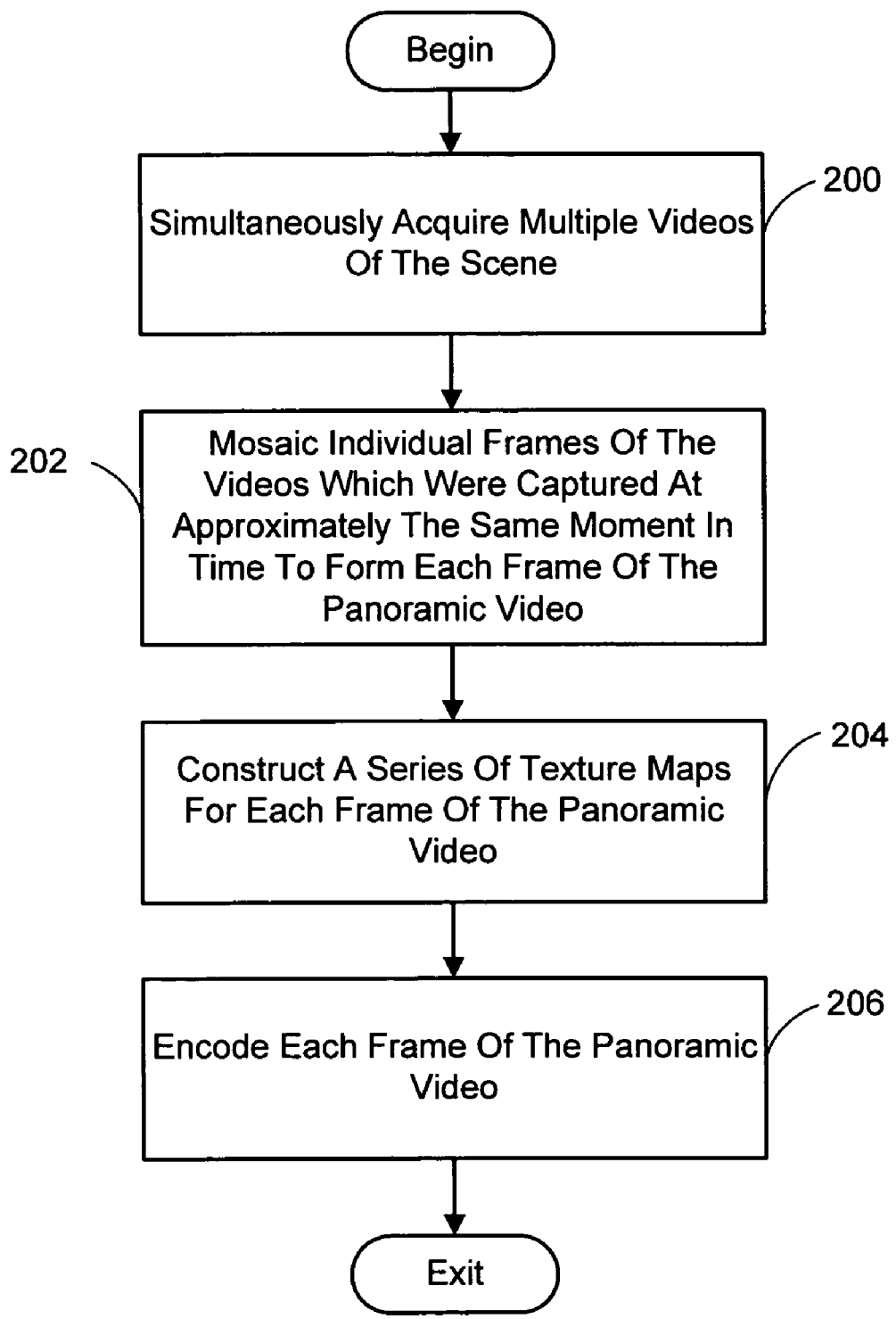
FIG. 2 is a flow chart diagramming an overall process for generating a panoramic video according to the present invention.

The exemplary operating environment having now been discussed, the remaining part of this description section will be devoted to a description of the program modules embodying the invention. In general, this approach to generating a panoramic video of a surrounding scene is accomplished via the following process actions, as shown in the high-level flow diagram of FIG. 2:

a) simultaneously acquiring multiple videos of the scene (process action 200);

b) mosaicing individual frames of the videos which were captured at approximately the same moment in time to form each frame of the panoramic video (process action 202);

c) constructing a series of texture maps for each frame of the panoramic video, each of which coincides with a portion of a prescribed environment model of the scene (process action 204); and d) encoding the frames of the panoramic video so as to facilitate their transfer and viewing (process action 206).

Each of these general process actions will be discussed in detail in the sections that follow.

1.0 Acquisition.

Essentially, the creation of a panoramic video in accordance with the present invention first entails acquiring multiple videos of the scene being depicted. These videos collectively depict a full 360 degree view of the surrounding scene. A specialized camera rig is employed for this purpose. The acquisition phase also includes a calibration procedure that provides information about the camera rig used to capture the videos that is used when creating the panoramic video.

1.1 The Camera Rig.

Figure 3:
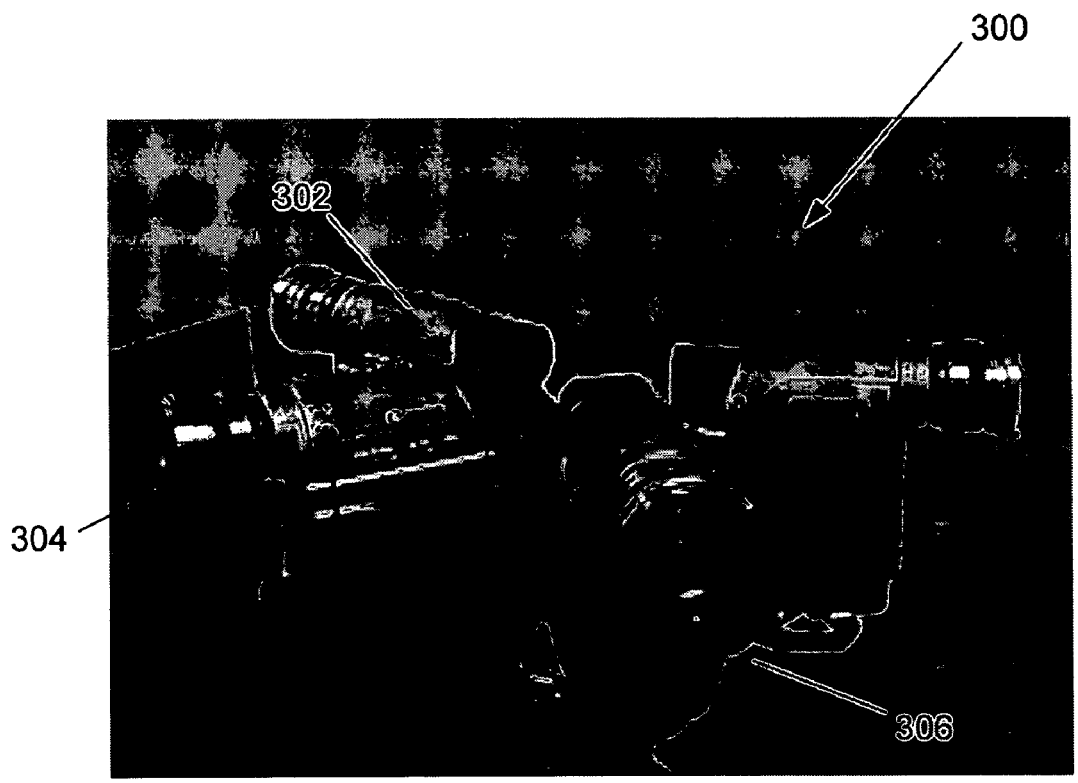
FIG. 3 is an image depicting a camera rig designed to acquire videos of a scene for use in generating a panoramic video in accordance with FIG. 2. It is noted that only four of the five cameras of the camera rig are shown.

Referring to FIG. 3, the camera rig 300 preferably consists of multiple digital video cameras 302 that are disposed in a back to back fashion such that their lenses 304 each point in a radially outward direction so as to view a different portion of the surrounding scene. The cameras 302 are mounted on a surface 306, which for calibration purposes is capable of being rotated 360 degrees. The direction of rotation is irrelevant and any reasonable rotation speed can be used (e.g., 20°/sec). Ideally, the cameras 302 would be mounted such that their optical axes are coplanar and intersect at a common point coinciding with the axis of rotation of the mounting surface 306. While it is desired to come as close to these ideal mounting conditions as possible, any misalignment will be identified as part of the calibration procedure and can later be compensated for during the construction of the panoramic video.

The number of cameras employed in the camera rig will depend on their field of view characteristics. The procedures used in creating the panoramic video according to the present invention will work best if the lateral field of view of each camera overlaps by at least about 20 percent. Thus, at least as many cameras as needed to provide a full 360 degree coverage of the scene including the desired overlaps would be employed. It is noted, however, that to minimize the cost of the camera rig and to reduce the processing and memory requirements of the present panoramic video system, it is preferred to use as few cameras as possible without significantly degrading the resolution of the resulting panoramic video. In this regard, if the foregoing field of view overlap cannot be achieved using a reasonable number of cameras with a standard lens arrangement, it is permissible to employ wide angle lenses. For the most part, distortion introduced by the wide angle lenses will be identified by the calibration procedure and can also be compensated for during the construction of the panoramic video. In a tested embodiment of the camera rig, it was determined that no more than five cameras should be employed (four of which are depicted in FIG. 3). The cameras chosen for this tested embodiment (i.e., Canon Elura digital video cameras) originally had a 55-degree lateral field of view, but were equipped with a wide angle adapter to produce a 90-degree field of view. Mounting five cameras so that their optical axes were spaced at equal separation angles from each adjacent camera resulted in the desired 360 degree coverage and 20 percent field of view overlap.

While, any digital video camera can be employed in the camera rig, it is preferred that the cameras be capable of recording in a progressive scan mode at 30 frames per second (i.e., a mode in which each raster line is sampled to produce each frame of the video, rather than every other line as is the standard recording mode of most video cameras). This was one of the factors that influenced the choice of the Canon Elura cameras for the aforementioned tested embodiment. The progressive scan mode is preferred as it is the typical mode for display on a conventional PC monitor, and it is envisioned that the panoramic video will primarily be viewed on a PC monitor. However, it is noted that the present invention is not intended to be limited to the use of a PC monitor as a display. Rather any appropriate display can be employed. For example, the panoramic video may be displayed on a television in an interactive television system. In that case, the progressive scan mode feature may not be needed. Image frames captured in this mode are also easier to stitch together to form a panoramic frame. Additionally, each of the cameras should be adjusted to have as near as possible the same settings. For example, it is preferred that each camera be set to the same zoom, focus, exposure, and shutter speed, as well as being white balanced in the same way and having any image stabilization feature turned off.

1.2 Pre-Calibration.

Figure 4:
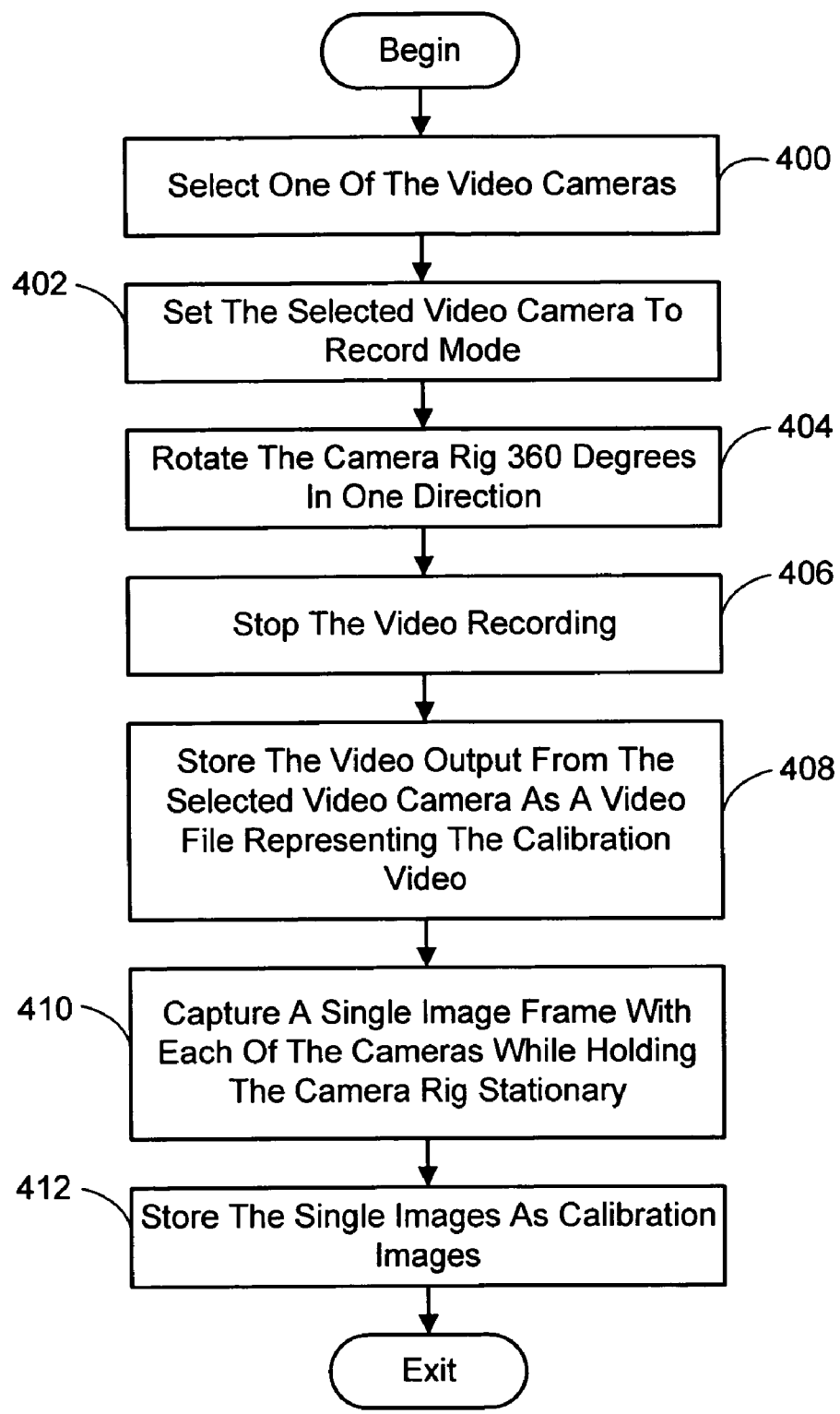
FIG. 4 is a flow chart diagramming one embodiment of a pre-calibration procedure used to produce a calibration video from one of the cameras of the camera rig, and a series of calibration images each of which was captured by a different one of the cameras, as part of the acquisition program module of the overall process of FIG. 2.

The first part of the calibration procedure involves producing a calibration video with one of the cameras and calibration images with all the cameras. For the purposes of this description, this first part of the calibration procedure will be referred to as the pre-calibration phase. In one embodiment of the pre-calibration phase, the following procedure is employed. Referring to FIG. 4, the first action 400 in the process involves selecting one of the video cameras to record the aforementioned calibration video. The selected video camera is set to record mode (process action 402) and the camera rig is rotated 360 degrees in one direction (process action 404). It is important that the scene remain relatively static during this recording sweep, and preferably the person performing the calibration should be out of the scene. Once the camera rig has been fully rotated, the video recording is stopped (process action 406). The video output from the selected video camera is stored as a video file (e.g., an .avi file) that represents the calibration video (process action 408). The next process action 410 involves holding the camera rig stationary while capturing a single image frame with each of the cameras. These images, which will be referred to as calibration images, are stored in memory for future use (process action 412).

Figure 5:
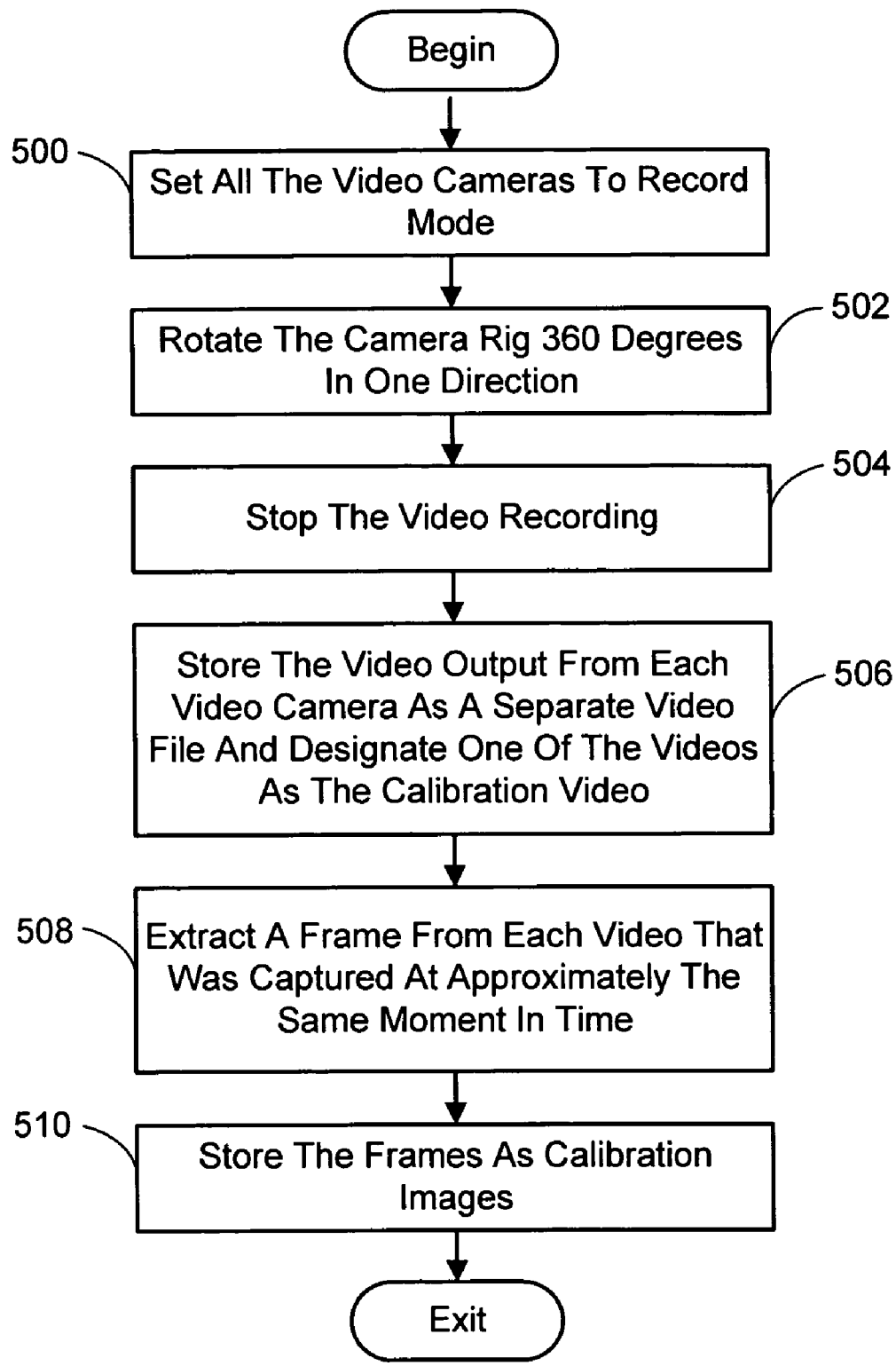
FIG. 5 is a flow chart diagramming an alternate embodiment of the pre-calibration procedure used to produce a calibration video from one of the cameras of the camera rig, and a series of calibration images each of which was captured by a different one of the cameras, as part of the acquisition program module of the overall process of FIG. 2.

The calibration video and images could also be obtained in other ways, as desired. For example, in an alternate embodiment, the pre-calibration phase could be accomplished as follows. Referring to FIG. 5, the first process action 500 of this alternate procedure involves setting all the video cameras to record mode. The camera rig is then rotated 360 degrees in the one direction (process action 502). As with the previously-described process, it is important that the scene remain relatively static during this recording sweep, and the person performing the calibration be out of the scene. Once the camera rig has been fully rotated, the video recording is stopped (process action 504). The video output from each camera is stored as video files, and one of them is designated as the calibration video (process action 506). The required calibration images are then obtained by extracting a frame from each video that was captured at approximately the same moment in time (process action 508). These images are stored in memory (process action 510) for future use in the next part of the process, referred to as the calibration phase.

1.3 Calibration.

Figure 6A:
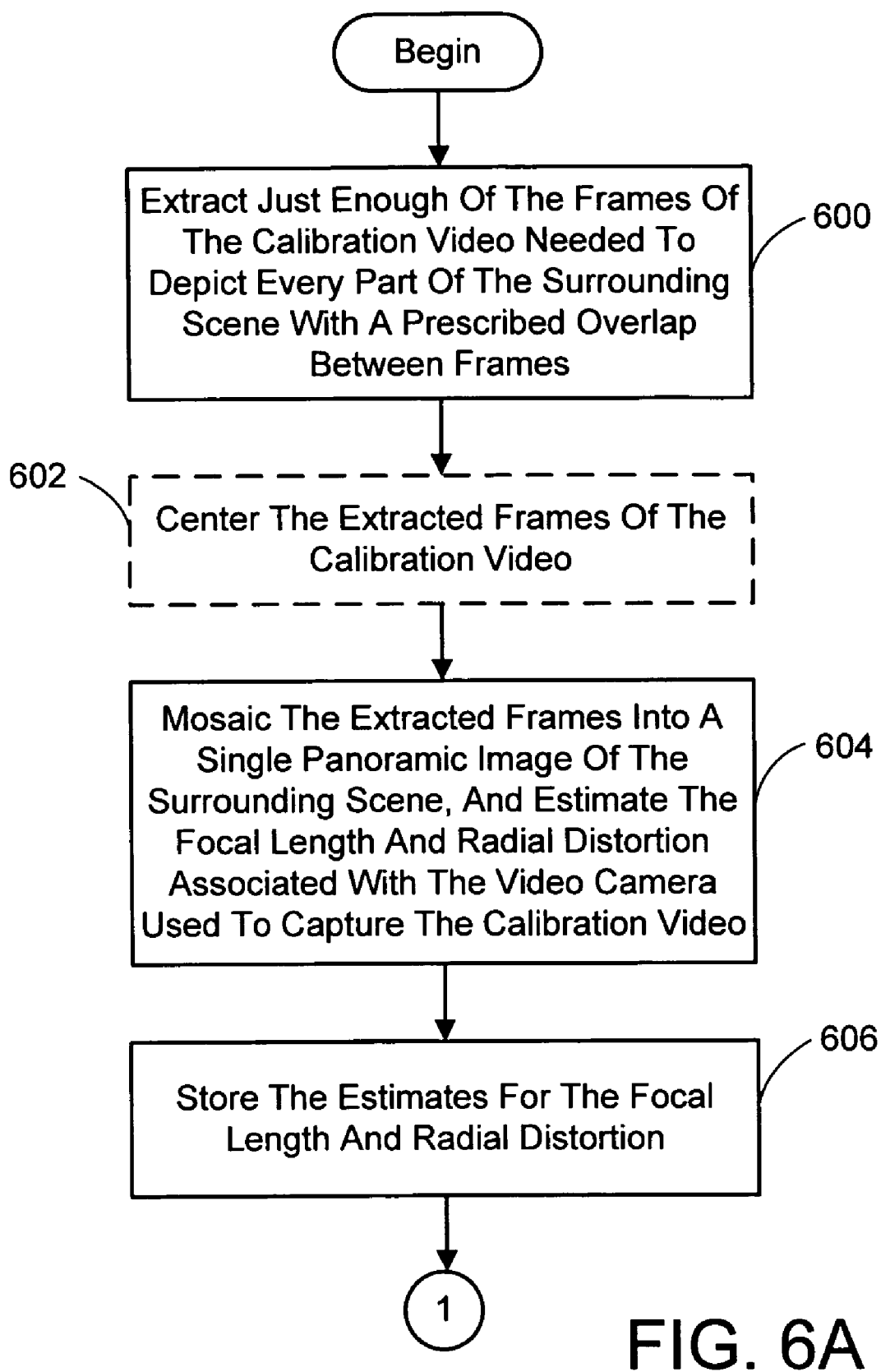
FIGS. 6A and 6B are flow charts diagramming a calibration procedure for estimating focal length, radial distortion, and rotation matrices for each camera of the camera rig, as well as optionally a deghosting correction field, as part of the acquisition program module of the overall process of FIG. 2.

The calibration phase first entails creating a panoramic image from the calibration video to derive an estimate for camera focal length and radial distortion, as outlined in the flow diagram of FIG. 6A. The calibration video will contain many more image frames than are necessary to produce a panoramic image of the surrounding scene. To this end, the first process action 600 is to extract just enough of the frames of the calibration video needed to depict every part of the surrounding scene with a prescribed overlap between frames. Preferably, the prescribed overlap is about one-half to three-quarters. In a tested embodiment of the present procedure, this meant that 20 evenly spaced frames from the calibration video sequence were selected. It is noted that if the rotation speed is approximately constant when the calibration video is created, the chosen frames could be evenly spaced in time or by rotation angle. However, if a constant speed is not maintained, the frames would be best chosen by selecting those evenly spaced by rotation angle. In such a case it would be convenient to keep track of the rotation angle at which each frame of the calibration video was captured.

Inaccuracies in the structure or alignment of the camera lenses can cause the images taken by the respective cameras to have different image centers. This is particularly true if wide angle adapters are employed. Thus, referring again to FIG. 6A, an optional centering procedure (process action 602) can be performed at this point in the calibration process. Any conventional process capable of shifting the selected frames so as to exhibit a common pixel location for the center of each image can be employed for this purpose. In a tested embodiment of the centering procedure, a conventional interactive image manipulation program was employed, and a user provided input to center the selected frames "by hand". It is noted that the centering action is shown in FIG. 6A with a broken line box to indicate it is optional. This same convention will be used through the present description to indicate optional process actions.

The next process action 604 in the calibration phase involves mosaicing or "stitching together" the extracted frames of the calibration video into a single panoramic image of the surrounding scene, and estimating the focal length and radial distortion associated with the video camera used to capture the calibration video. While any existing mosaicing process can be employed for this purpose, it is preferred that it be accomplished using the methods taught in U.S. Pat. No. 6,018,349 entitled "Patch Based Alignment Method and Apparatus For Construction of Image Mosaics, the disclosure of which is hereby incorporated by reference. This preferred method involves a patched based alignment method which aligns a set of overlapping images to construct a mosaic image. Essentially, the images are aligned by first finding an incremental deformation of one image relative to a 3-dimensional coordinate system tending to reduce registration error between overlapping portions of the pair of images, and then warping the one image in accordance with the incremental deformation. A consequence of using this preferred method is that the focal length and radial distortion associated with the camera used to capture the calibration video are estimated as part of the mosaicing process. These parameters are needed to create a panoramic video according to the present invention. If another mosaicing technique is employed that does not produce these parameters, then they should be determined via other conventional methods. The estimates for the focal length and radial distortion are stored in memory for future use (process action 606). It is noted that while the estimated focal length and radial distortion are specific to the particular video camera that was used to capture the calibration video, it can be assumed that these parameters will be the same for all the video cameras since each camera is the same and uses roughly the same camera settings. Thus, the stored focal length and radial distortion estimates will be deemed to apply to all of the video cameras.

Figure 6B:
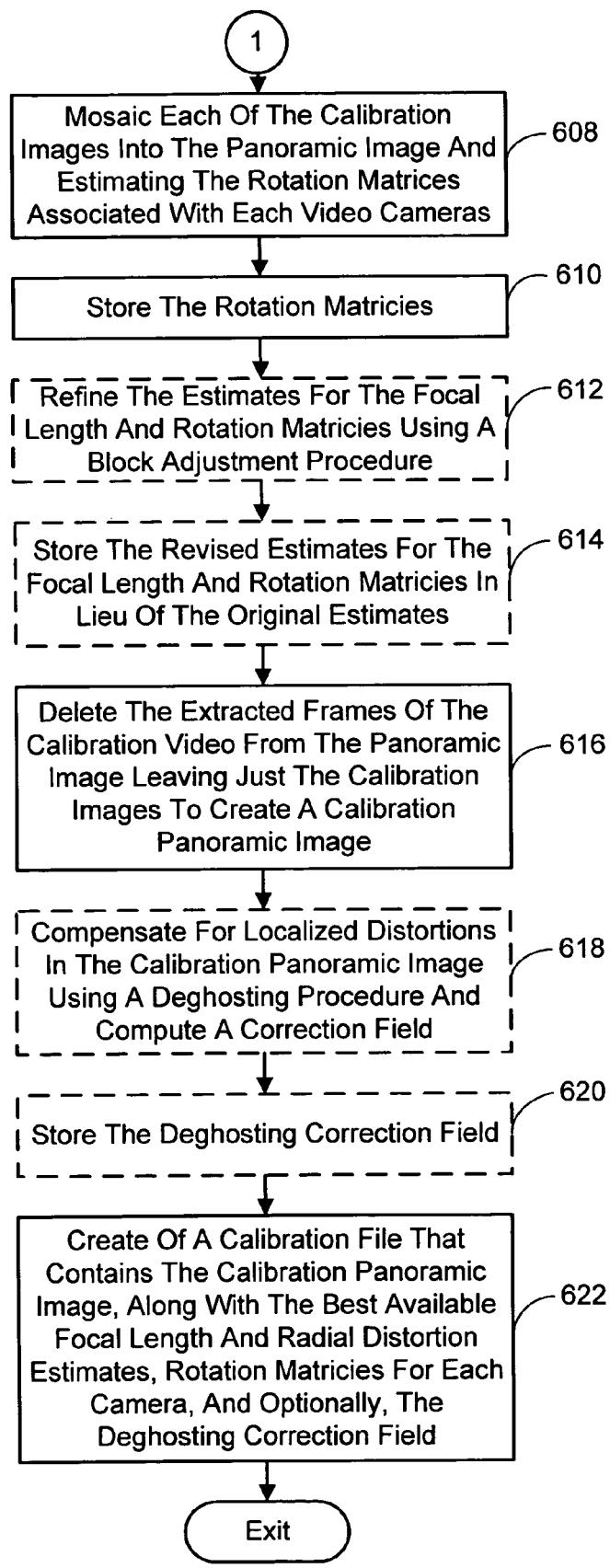

Referring now to FIG. 6B, the calibration phase continues with a process action 608 of mosaicing each of the previously captured calibration images into the panoramic image and estimating the rotation matrices associated with the video cameras used to capture the calibration images. Here again it is preferred that the process described in U.S. Pat. No. 6,018,349 be used to accomplish this task. In this case, a by-product of the preferred mosaicing process will be estimates of the rotation matrices associated with each video camera. These rotation matrices are also needed to create a panoramic video according to the present invention. Thus, if another mosaicing technique is employed that doesn't produce the matrices, then they should be determined via other conventional methods. The rotation matrices are also stored for future use (process action 610).

A block adjustment procedure may optionally be performed at this point in the calibration to refine the estimates for the focal length and rotation matrices (process action 612). Preferably, the block adjustment procedure described in U.S. Pat. No. 5,987,164 entitled "Block Adjustment Method and Apparatus for Construction of Image Mosaics" is employed for this purpose, the disclosure of which is hereby incorporated by reference. This procedure is advantageous as the aforementioned mosaicing process, while doing a good job of aligning each individual image to the mosaic, tends to accumulate registration errors as each new image is added to the panorama. Thus, the rotation matrices and focal lengths derived from the stitched image frames will be skewed by this registration error. The block adjustment procedure reduces the accumulated error by simultaneously minimizing the mis-registration between all overlapping pairs of images. Essentially, this is done by adjusting the rotation matrices and focal lengths. Thus, refined versions of these parameters result when the mis-registration is minimized. Once determined, the revised estimates for the focal length and rotation matrices are stored in lieu of the original estimates (process action 614).

The frames of the calibration video used to create the original panoramic image are next deleted (process action 616), thereby leaving just the calibration images captured by the cameras. These images form a panoramic image that will be referred to as the calibration panoramic image.

The aforementioned block adjustment procedure is in essence a global alignment of the images making up the panoramic image. However, there can still be localized mis-registrations present in the calibration panoramic image that can appear as double images (ghosting) or blurring. One way such distortions can occur derives from the fact that the mosaicing process assumes an idealized camera model. However, in actuality un-modeled radial distortion (i.e., that component of the radial distortion that cannot be adequately modeled in the mosaicing process), tangential distortion, and non-square pixel distortion, among other anomalies can cause the local mis-registrations of the images. Further, in regard to the aforementioned calibration images making up the calibration panoramic image, these images were captured by the respective cameras from different viewpoints. While this is irrelevant for objects in the scene that are far away from the cameras, objects that are closer in can create a double image in the calibration panorama. This is referred to as parallax distortion. It is akin to a person bringing an object closer and closer to their eyes. At some point the object appears as two instead of one because the person's eyes are viewing it from different viewpoints. In the context of the calibration panorama, a close-in object depicted in two of the calibration images captured by adjacent cameras can result in a double image in the overlap region of these images in the calibration panoramic image.

To compensate for these localized distortions, an optional deghosting process can be employed as indicated by process action 618 of FIG. 6B. Generally, the deghosting procedure computes the amount of local mis-registration and then each image in the panorama is locally warped to reduce any ghosting or blurring. Preferably, this is accomplished using the procedures described in U.S. Pat. No. 5,986,668 entitled "Deghosting Method and Apparatus for Construction of Image Mosaics", the disclosure of which is hereby incorporated by reference. Essentially, this preferred method involves computing the optical flow between all pairs of images, and inferring the desired local warps from these computations. In addition, this process results in a correction field describing the local mis-registration corrections that can be stored for use in the production of the panoramic video (process action 620), as will be discussed later. It is noted that if another deghosting method is employed which does not provide the local mis-registration correction field, then the field could be derived using other conventional methods.

Finally, the calibration ends with the creation of a calibration file that optionally contains the "distortion-corrected" calibration panoramic image, along with the best available focal length and radial distortion estimates, rotation matrices for each camera, and optionally, the deghosting correction field (process action 622). It is noted that the inclusion of the calibration panoramic image is optional since it is not actually used in the creation of a panoramic video as are the other items constituting the calibration file. However, the calibration panoramic image does provide a visual indication of the accuracy of the calibration process, and so can be included for that purpose. In a tested embodiment of the present invention this calibration file was given a ".cmpn" file name suffix for identification purposes. As indicated previously, the information contained in the calibration file will be used in the process of creating the panoramic video, specifically to correct for distortions in the frames of the panoramic video.

It is noted that any time the camera rig or the camera settings are adjusted, it is necessary to repeat the calibration procedure to produce a new calibration file before creating a panoramic video. Also, it should be noted that the preferred mosaicing procedure used to process the calibration images from each camera will represent the panorama as the individual image frames plus associated transforms for each. Thus, when it was stated that the calibration panorama was included in the calibration file, it was meant that the individual image frames plus their associated transforms are actually made part of the file.

2.0 Generating A Panoramic Video.

Figure 7A:
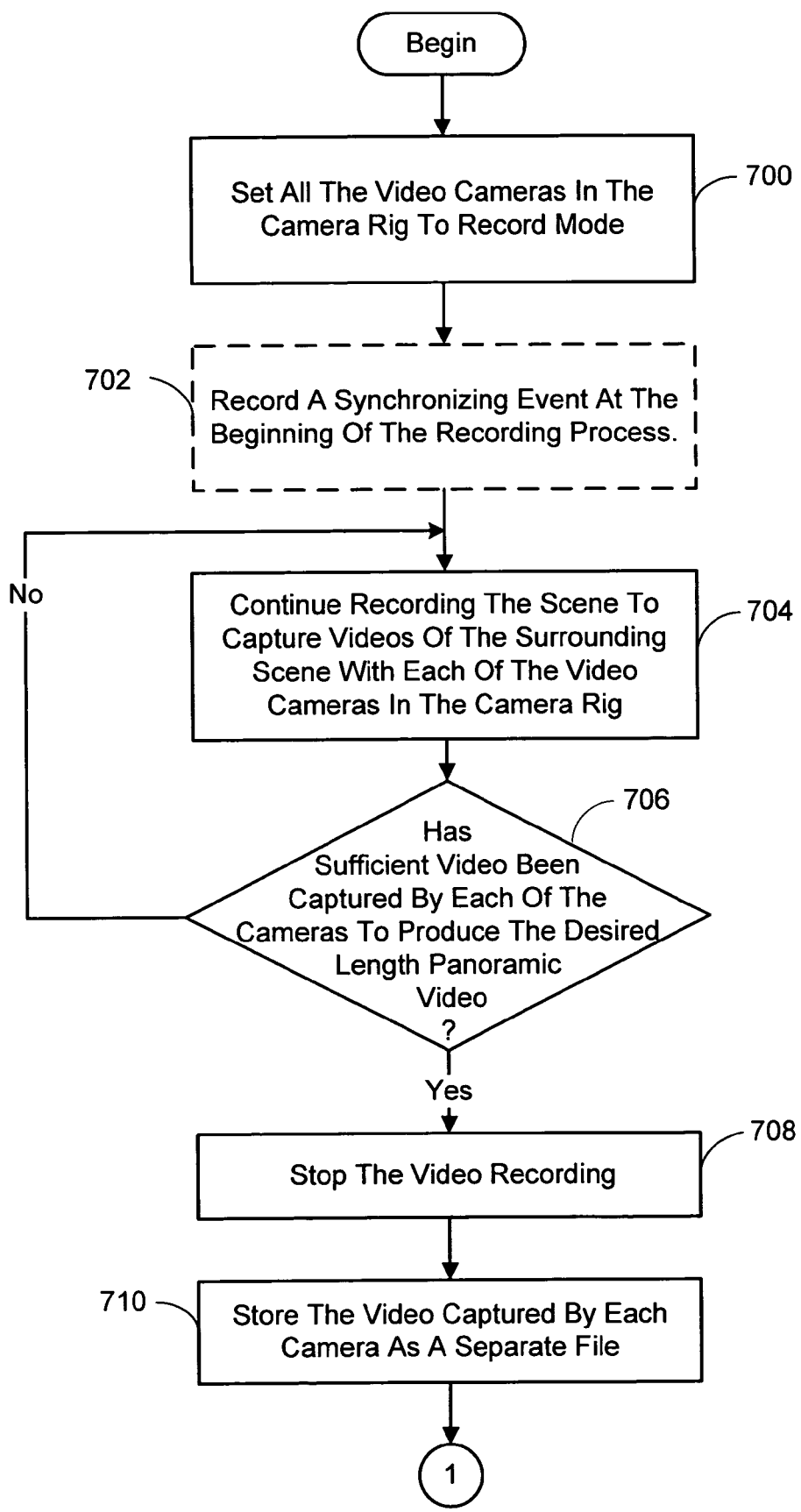
FIGS. 7A through 7C are flow charts diagramming a panoramic video generation program module of the overall process of FIG. 2.
Figure 7B:
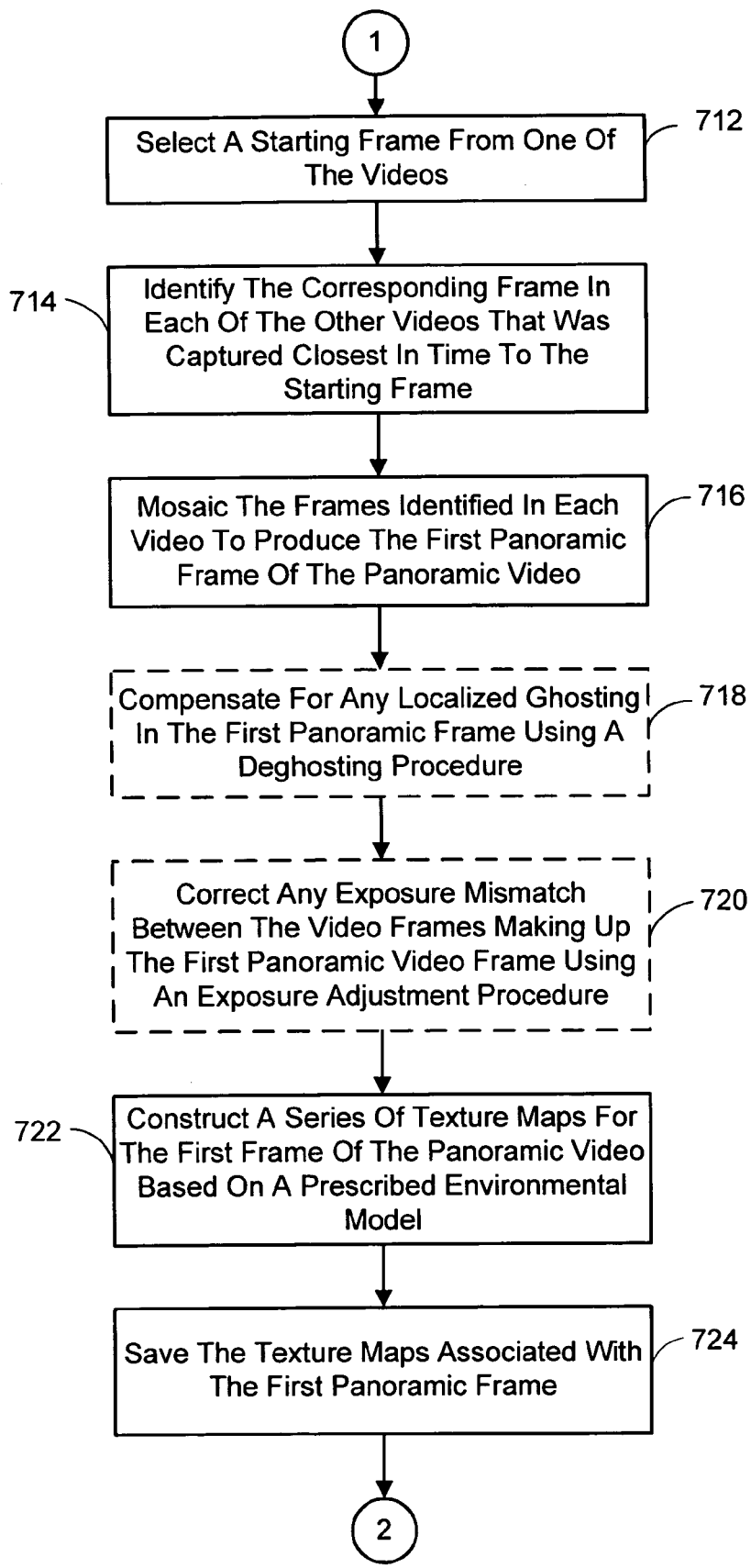
Figure 7C:
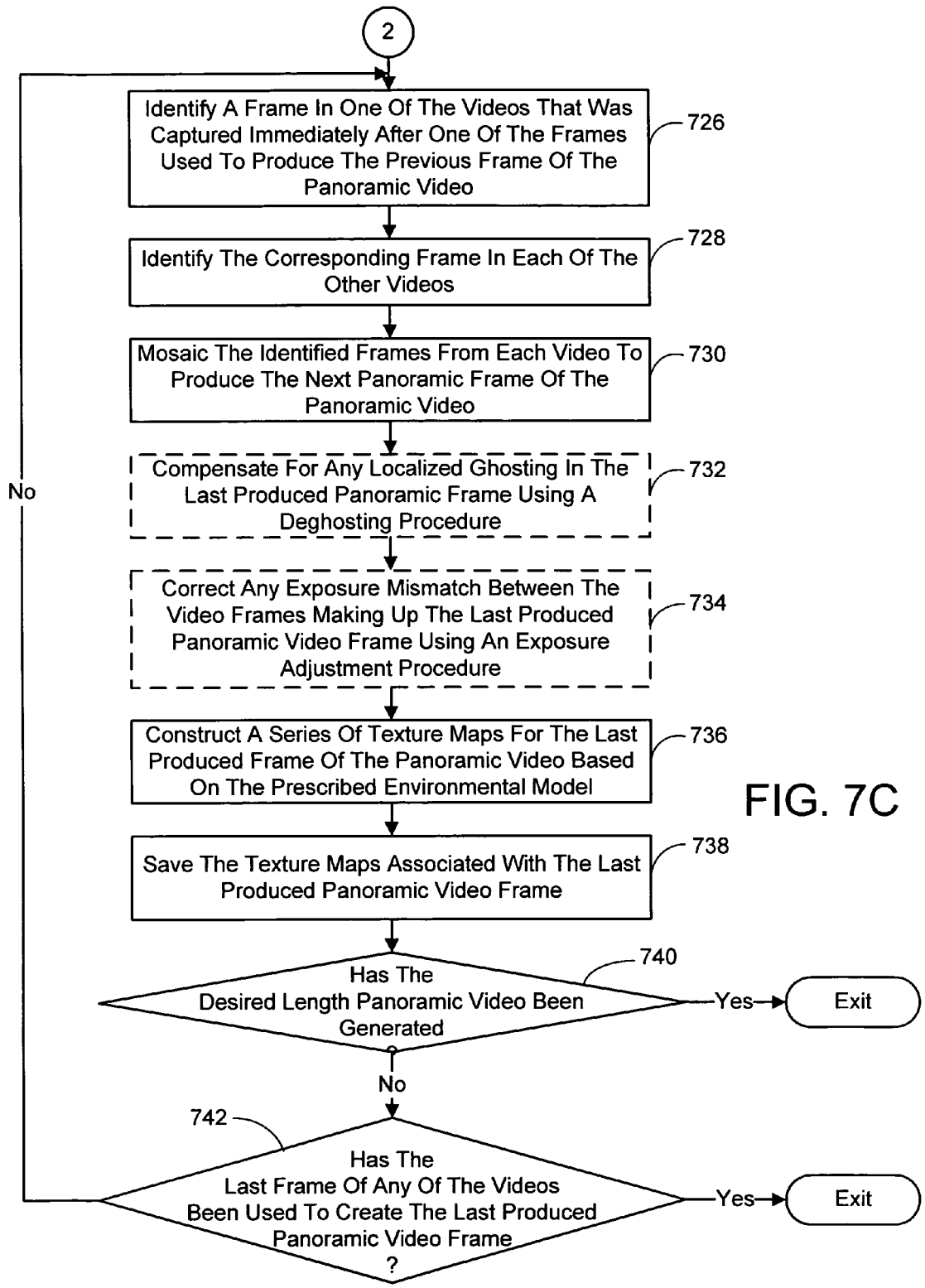

A panoramic video is generated or "authored" in accordance with the present invention as follows. Referring to FIGS. 7A-C, the first process action 700 entails setting all the video cameras in the camera rig to record mode. Ideally, the cameras would have a synchronization feature by which each camera can be started at the same instant. In this way, the frame numbers of the frames captured by each camera will correspond. For example, the first frame captured by each camera will have been captured at the same time, the second frame captured by each camera would have been captured at the same time, and so on. It is important to know which frames were captured by the cameras at the same time because these corresponding frames will be stitched together into a panoramic image that will form one of the frames of the panoramic video. However, if the cameras do not possess a synchronization feature, an alternate procedure can be performed to find the frames captured by the cameras at the same time. As indicated in optional process action 702 of FIG. 7A, a synchronizing event is recorded at the beginning of the recording process. This event will be used to find the corresponding frames.

Preferably, the synchronizing event involves bringing an object simultaneously into the view of each pair of adjacent cameras, in turn, or performing some action in the view of each adjacent pair of cameras, in turn. For example, a clapboard could be used for this purpose. While this synchronizing method is preferred, other methods can be employed. For example, an object could be simultaneously brought into view of all the cameras at the same time. This might be accomplished by bringing a box or ring into the field of view of all the cameras. However, it is noted that because each camera must "see" the object simultaneously, this could be a difficult task. Another synchronizing method that could be employed would be to suddenly change the illumination in the environment to a noticeable degree. This has the advantage that all the cameras would "see" this event at the same time. Of course, this last method is only appropriate for indoor environments where control of the illumination is feasible.

The recording of the scene then continues to capture videos of the surrounding scene with each of the video cameras in the camera rig (process action 704). The recording continues until it is determined that sufficient video has been captured by each of the cameras to produce the desired length panoramic video (process action 706). At that point, the recording is stopped (process action 708). It is noted that the scene need not be static during this recording, unlike the recording phase of the calibration procedure. The video captured by each camera is stored as a separate file (process action 710). For example, each video was saved as a standard .avi video file in a tested embodiment of the invention.

Once the videos that are to be made into the panoramic video have been captured, they are processed to create individual frames of the panoramic video. Referring to FIG. 7B, this is accomplished by first selecting a starting frame from one of the videos (process action 712). Next, the corresponding frame in each of the other videos is identified, where a corresponding frame is defined as one which was captured closest in time to the frame under consideration (process action 714).

In the case where the video cameras include the aforementioned synchronization feature by which each camera can be started at the same instant, the determination of which frames in the other video are corresponding is simply a matter of finding the frames with the same frame number. However, if the cameras do not have this feature, and a synchronization event was recorded, the process of identifying corresponding frames in the other videos is more involved. In general, the process involves identifying the frame number in each video that coincides with the recorded synchronization event. In other words, the frame number of the frame in which the synchronization object first appears, or when the synchronization action is performed (e.g., the clap of the clapboard), in each video, would be identified. The relative frame number offsets among the cameras are then computed. In the case where one synchronization event is provided for all the cameras simultaneously, this computation is straightforward. For example, one of the videos could be selected as base video, and the number of frames before or after that frame that the synchronization event occurred in the other video would be established as the offset for that video. If the event occurred in an earlier frame of the base video then the offset is deemed to be positive, and if the event occurred in a later frame of the base video then the offset is deemed to be negative. The offsets are used to identify which frames in the videos were captured at approximately the same moment.

The process is somewhat different when the synchronizing event involves bringing an object simultaneously into the view of each pair of adjacent cameras or performing some action in the view of each adjacent pair of cameras. For example, one way of determining the relative offsets would be to first select one of the videos as a base video, and then identify the frame number of the first synchronization event in that video. It is noted that each video will have two synchronization events recorded, as each adjacent pair of cameras is "shown" an event. The number of frames before or after the identified frame in the base video, at which the adjacent camera in the synchronization pair recorded the same synchronization event, is then identified and assigned as the offset between the cameras under consideration. Here again, if the event occurred in an earlier frame of the base video then the offset is positive, and if the event occurred in a later frame of the base video then the offset is negative. This same procedure is then repeated for the videos captured by the next adjacent pair of cameras, which includes the "non-base" camera just considered. The only difference is that the second synchronization event is identified in the previously considered video, whereas the first synchronization event is identified in the previously-unconsidered video. The result of this second comparison is the offset between the previously-considered video and the newly considered video. This new offset is added to the sum of all the previous offsets (which in this second iteration is just the offset between the base video and the video of the first adjacent camera). The newly computed sum represents the offset of the previously unconsidered video to the base video. The procedure then continues in this manner until all the videos have been considered.

Once the frame offsets have been computed (if necessary), they are used to identify the corresponding frame in each of the other videos that was captured at approximately the same moment as the selected "starting" frame. It is noted that the chosen starting frame should occur after the last synchronizing event existing in any of the videos so that the synchronizing events do not become part of the finished panoramic video.

Referring once again to FIG. 7B, the first frames identified in each video via the foregoing procedure are stitched together to produce the first panoramic frame of the panoramic video (process action 716). Preferably, this is accomplished using the aforementioned mosaicing process of U.S. Pat. No. 6,018,349, and the parameters saved in the calibration file (i.e., the focal length and radial distortion estimates, the rotation matrices for each camera, and possibly the deghosting correction field).

It should be noted, however, that while the deghosting correction field potentially provided in the calibration file can be used to correct much of the camera related distortion, there may be objects which were located close-in to the cameras that would result in a double image (i.e., parallax distortion) in one or more of the panorama video frames. Granted, if the scene being recorded in the panoramic video is the same as the scene used to create the aforementioned calibration panoramic image, then some close in objects that are stationary in the scene may be compensated for by the deghosting correction field of the calibration file. However, a different scene may be involved in the panoramic video, and even in cases where the same scene is used, new close-in objects may be present that were not there during the calibration recording. Thus, it is advantageous to perform a deghosting procedure to compensate for any localized ghosting in the mosaiced panoramic frame (process action 718). The preferred deghosting procedure is the same one described earlier and the subject of U.S. Pat. No. 5,986,668.

Further, it was stated earlier that each camera was to be set at the same exposure setting. However, this can be a difficult task, and it is possible that the video captured by one camera may have a somewhat different exposure level than the video captured by another of the cameras. If this is the case, then an optional exposure adjustment procedure could be applied to correct any exposure mismatch between individual video image frames making up each of the panoramic video frame (process action 720). While any appropriate exposure adjustment procedure could be employed, it is preferred that a new method be employed. This new method is the subject of a co-pending application entitled "System and Method for Exposure Compensation" by the inventors of this application and assigned to the common assignee. The co-pending application was filed on Jul. 7, 2000 and assigned Ser. No. 09/611,645. The disclosure of this co-pending application is hereby incorporated by reference.

As mentioned previously, the preferred mosaicing procedure results in each panoramic frame of the panoramic video being represented as the individual images plus associated transforms for each. This data is preferably converted into one of more images that can be readily viewed. One way of accomplishing this is by using the individual images and associated transformations to construct a series of texture maps for the frame of the panoramic video based on a selected environment model (process action 722). The shape of the environment model is left up to the author of the panoramic video. For example, the environment model could be as simple as a cube. Or it could be more complex, such as a faceted cylinder, sub-divided dodecahedron, or even a latitude-longitude tesselated globe. The preferred approach for constructing the aforementioned texture maps is described in U.S. Pat. No. 6,009,190 entitled "Texture Map Construction Method and Apparatus for Displaying Panoramic Image Mosaics", the disclosure of which is hereby incorporated by reference. Essentially, this method involves, for a panoramic video frame, computing the color associated with each pixel in the texture map associated with the environment model by first converting the pixel address to a 3D ray, and then mapping this ray into each of the individual images making up the panoramic video frame using the previously computed transforms. The colors picked up from each pixel of the individual images where the ray was actually directed (which may be just one if not in an overlapping region) are blended (as necessary) to determine the final pixel color.

The resulting texture maps associated with the panoramic frame are then saved (process action 724), as will be discussed more fully in the section concerning the encoding of the panoramic video.

The foregoing process produced the first frame of the panoramic video. This same process is then essentially repeated to produce each succeeding frame. Specifically, referring now to FIG. 7C, a frame that was captured in time immediately after one of the frames just used to produce the previous frame of the panoramic video is identified in one of the videos (process action 726). Next, the corresponding frame in each of the other videos is identified (process action 728). The identified frames from each video are then stitched together to produce the next panoramic frame of the panoramic video (process action 730). As with the first frame of the panoramic video, a deghosting procedure can optionally be performed to compensate for any localized ghosting as indicated in optional process action 732. Additionally, if the previously described exposure mismatch exists, then the optional exposure adjustment procedure could be applied to correct it (process action 734). A series of texture maps is then created to act as the current frame of the panoramic video based on the selected environment model (process action 736). And finally, as before, the resulting texture maps are saved (process action 738). The process of actions 726 through 738 are then repeated to produce each successive frame of the panoramic video until either the desired length video is generated as indicated in process action 740, or the last frame is encountered in one of the individual video being used to create the panoramic video as indicated in process action 742.

It is noted that in the foregoing procedures, the series of texture maps associated with each frame of the panoramic video is created just after the frame is stitched together from the frames of the individual videos of the scene. However, this need not be the case. Rather, all the frames of the panoramic video could be stitched together first, and then the aforementioned texture maps created for each one.

3.0 Encoding The Panoramic Video.

The foregoing procedure generates data files containing the video texture maps that will be used by a panoramic video viewer to play the panoramic video. An example of one such viewer is the subject of U.S. Pat. No. 6,559,846 entitled "Panoramic Video Viewer" by the inventors of this application and assigned to the common assignee, and the disclosure is hereby incorporated by reference. This viewer, as well as other viewers that may be employed, will need certain information to play panoramic videos produced in accordance with the present invention.

First, the viewer will need the data associated with the texture maps of the panoramic video frames, or at least a pointer as to where it can be found or obtained. In regards to the use of pointers, if the panoramic video were stored on a medium of some type (e.g., hard drive, CD, DVD, and the like) that is directly accessible by the viewer, then the pointers would identify where on the medium the viewer can obtain the data as needed. In addition, the sequence in which the pointers are provided in the .vvi file would preferably be indicative of the order in which the associated data should be played. Thus, the viewer could access the data associated with one frame of the panoramic video, and then that associated with the next frame, and so on. The situation is similar if the panoramic video is provided over a network connection, with the exception that the pointers would refer to data that is fed to the viewer from a server after the .vvi file is provided. The viewer will also need to know the shape of the environment model used to create the texture maps. This information is needed because if a different model were assumed during the rendering of the scene from the texture maps, distortion could result. And finally, the viewer should be informed of any navigation boundaries present in the data. For example, if just the panoramic video frames created from the videos captured by the previously described camera rig are provided, then there would be no data associated with regions above and below the longitudinal field of view of the cameras. Thus, the navigation boundary information might describe the maximum up and down angle that the viewer can display to a user.

Preferably, the foregoing information is provided as elements in a specialized file, which will be referred to for the purposes of the present invention as a .vvi file.

It should be noted in regard to the navigational boundaries, that any gaps in the data, such as the regions above and below the longitudinal field of view of the cameras in the previously-described camera rig, could be filled using static texture maps. This could be accomplished by, in addition to providing the data associated with each frame of the panoramic video, a static texture map that would be used by the viewer as an addendum to all the panoramic video frames. For example, suppose the scene captured in the panoramic video was a room. The ceiling of the room would typically not change throughout the video. Therefore, a static image of the ceiling could be provided and displayed by the viewer, should the user want to pan up past the data provided by the panoramic video frames. Each static texture map, if provided, could be included as an additional data element in the aforementioned .vvi file. Alternately, the .vvi file could just include a pointer to a file (e.g., a bitmap or .bmp file) containing the static texture map data.

Figure 8:
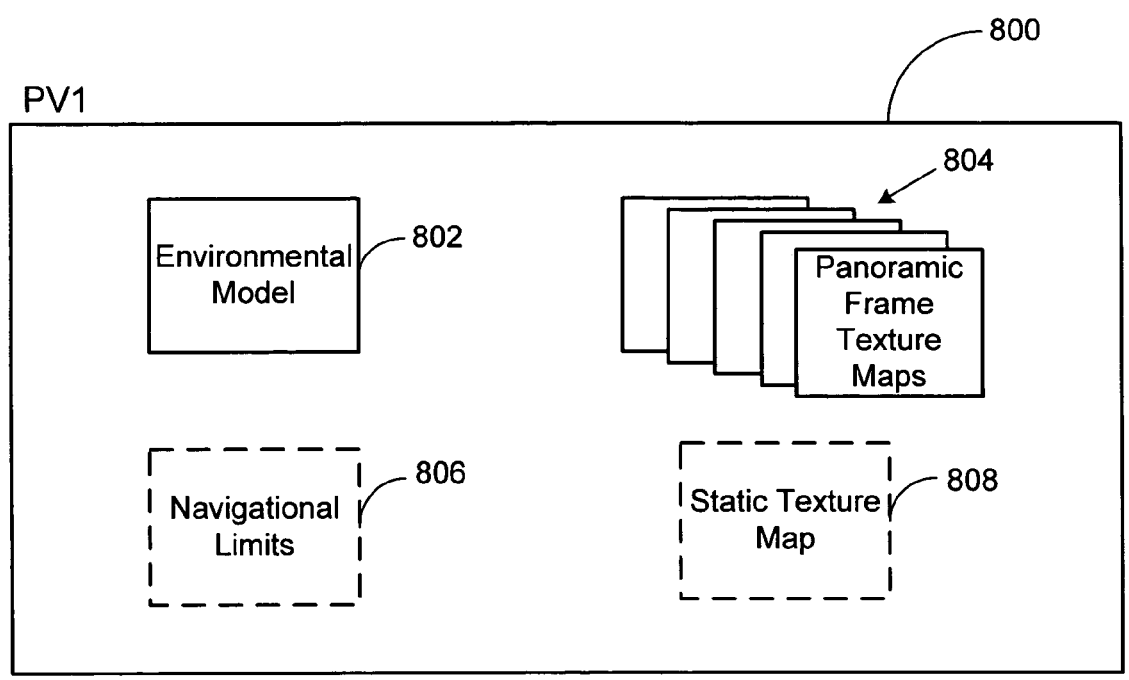
FIG. 8 is a block diagram illustrating a .vvi data file according to the present invention.

Referring to FIG. 8, a diagram is provided that conceptionally illustrates the configuration of the above-described .vvi file. The .vvi file 800 would be designated by a file name preferably indicative of the panoramic video it is associated with. For example, the depicted .vvi file 800 is designated PV1. The file 800 includes a data structure formed from a plurality of elements or fields. For example, the .vvi file would include an environment model element 802, and a plurality of elements 804 associated with the texture map data representing each frame of the panoramic video. As indicated above, the order of these texture map elements preferably corresponds to the order in which they should be "played". Additionally, the .vvi file structure could include an element 806 providing navigational limits, and may also include one or more elements 808 associated with the previously-described static texture maps. The elements 806 and 808 are shown as broken line boxes as they are optional in nature and may or may not be present in the .vvi file, depending on the circumstances.

It may be advantageous to compress the data associated with the panoramic video frames. While uncompressed files could be stored on a medium such as a hard drive, CD or DVD, it would be better to compress them if the files are intended to be transferred over a network (e.g., the Internet). Any compression process could be used for this purpose. For example, in a tested embodiment of the present invention, the data files containing the texture maps associated with frames of the panoramic video had the standard .avi format. Microsoft Corporation's "WINDOWS MEDIA™ ENCODER" was employed to convert the .avi files into compressed files having a standard .asf file format. If the data is compressed, then the .vvi file would contain the compressed data (or pointers thereto) as elements in place of the original uncompressed data (or pointers thereto).

It is also noted that an audio track could be added to the panoramic video which could be encoded into the compressed or uncompressed data files (e.g., .avi or .asf files). This can be accomplished via any appropriate conventional video editing program. For example, in a tested embodiment of the present invention, the audio track captured by one of the cameras in the camera rig was inserted into the texture map data files using Adobe Premiere. If the audio data is encoded into the texture map data files, the viewer would decode the audio and play it back in conjunction with playing the texture map of each panoramic video frame. It is noted that instead of just using the audio track captured by one of the cameras, a combined audio track composited from sound recorded by some or all the cameras could be employed. Further, it is noted that in a real environment, an observer would expect to hear different things as they viewed different parts of the scene. Namely, as the view of the scene changed, some environmental sounds would fade as others increase in volume. Thus, what is heard in a real environment is dependent on the listener's orientation, such as which way the listener is facing. This phenomenon of hearing a different mix of environmental sounds depending on which way a person is facing can be simulated in the panoramic video produced in accordance with the present system and process. In general, this can be accomplished by encoding multiple audio tracks into the texture map data files, each of which is representative of the environmental sounds that would be heard by an observer when viewing a particular portion of the scene. More specifically, each camera in the camera rig would be used to record the environment sounds. The audio data recorded by each camera would be used to represent the environmental sounds that would be heard by a listener facing the portion of the scene contained within the camera's field of view. The audio data thus associated with each portion of the scene covered by the camera rig would be encoded into the texture map data files. Specifically, the sound recorded for a particular portion of the scene would be assigned to the texture map data representing that portion, on a temporal basis. In other words, the sound recorded at the time each image of the scene is captured by one of the cameras would be assigned to the portion of the texture map data derived from that image. The panoramic video viewer employed to play a panoramic video having this view-specific audio data would be expected to decode it and play back the particular audio assigned to the portion of the scene that is currently being viewed by a user of the system. If the portion of the scene being viewed cuts across the regions captured by adjacent cameras of the camera rig, the viewer could blend the audio assigned to each region (e.g., proportionally) and play this composite audio in conjunction with the texture maps associated with that part of the scene.

While the invention has been described in detail by specific reference to preferred embodiments thereof, it is understood that variations and modifications thereof may be made without departing from the true spirit and scope of the invention. For example, the present invention is not limited to the exemplary camera rig described earlier. Additional cameras could be added to capture the part of the scene above and below the longitudinal field of view of the cameras used in the exemplary rig. The videos captured by these cameras would be processed in the same way and included in the texture maps saved in the aforementioned data files.

Wherefore, what is claimed is:

1. A computer-implemented process for generating a panoramic video of a scene, comprising:
using a computer to perform the following process actions,
acquiring multiple videos of the scene, wherein each of said videos was captured using a separate camera, and wherein said acquiring comprises,
employing a camera rig that is capable of recording the videos of the scene, said camera rig comprising multiple video cameras disposed so as to view different portions of the scene which collectively cover a 360 degree view of the scene,
setting all the cameras of the camera rig to record mode,
deactivating the record mode on all the cameras once sufficient video has been captured by each to ultimately produce the desired length panoramic video, and
determining the relative frame offsets between all the cameras, wherein the frame offset between any pair of cameras is defined as the number of frames before or after a particular frame number of the video captured by one of the cameras and the frame number of a frame of the video captured by the other camera at approximately the same moment in time;
mosaicing individual frames of the videos which were captured at approximately the same moment in time to form each frame of the panoramic video; and
constructing a series of texture maps for each frame of the panoramic video, each of which coincides with a portion of a prescribed environment model of the scene.

2. The process of claim 1, wherein the process action of determining the relative frame offsets, comprises the process actions of:
recording a synchronizing event after all the cameras of the camera rig have been set to record mode;
identifying the frame number in each video coinciding with the beginning of the synchronization event; and
computing the relative frame offsets among all the cameras based on the frame numbers associated with the beginning of the synchronization event in each video.

3. The process of claim 1, wherein the process action of determining the relative frame offsets, comprises the process actions of:
employing cameras in the camera rig that have a synchronization feature wherein all the cameras can be set to record mode simultaneously such that corresponding frame numbers in the captured videos correspond to frames captured at the same moment in time
designating the frame offsets to be zero.

4. The process of claim 1, wherein the process action of mosaicing individual frames of the videos which were captured at approximately the same moment in time to form each frame of the panoramic video, comprises the actions of:
(a) selecting one of the videos and choosing a starting frame from the selected video;
(b) identifying the corresponding frame in each of the non-selected videos that was captured closest in time to the chosen starting frame;
(c) mosaicing the chosen starting frame and the identified corresponding frames of the videos to form the first frame of the panoramic video
(d) selecting a frame in one of the videos that was captured immediately after a frame used to form the last-produced frame of the panoramic video;
(e) selecting the corresponding frame in each of the other videos that was captured closest in time to the previously selected frame;
(f) mosaicing the selected frames to form a next frame of the panoramic video; and
(g) repeating process actions (d) through (f) until either the desired length panoramic video is generated or the last-produced frame of the panoramic video was formed using in part the last frame of one of the videos.

5. The process of claim 4, further comprising the process actions of:
  employing a camera rig that is capable of recording the videos of the scene, said camera rig comprising multiple video cameras disposed so as to view different portions of the scene which collectively cover a 360 degree view of the scene;
  calibrating the camera rig to obtain at least an estimate of the focal length, radial distortion, and rotation matrix associated with each camera, and wherein
  the process action of mosaicing the chosen starting frame and the identified corresponding frames to form the first frame of the panoramic video comprises a process action of employing at least the estimated focal length, radial distortion, and rotation matrix associated with each camera to assist in stitching the frames together.

6. The process of claim 4, further comprising the process actions of:
  following performing the action of mosaicing the chosen starting frame and the identified corresponding frames of the videos to form the first frame of the panoramic video, computing a deghosting correction field that characterizes the local warping needed in each of said video frames to reduce any double imaging or blurring associated with localized mis-registrations; and
  employing the computed deghosting correction field to reduce any double imaging or blurring in the first frame of the panoramic video.

7. The process of claim 4, further comprising the process action of, following performing the action of mosaicing the chosen starting frame and the identified corresponding frames of the videos to form the first frame of the panoramic video, adjusting the exposure of the first panoramic video frame to reduce any exposure mismatch between the video frames used to form said first frame.

8. The process of claim 4, further comprising the process actions of:
  employing a camera rig that is capable of recording the videos of the scene, said camera rig comprising multiple video cameras disposed so as to view different portions of the scene which collectively cover a 360 degree view of the scene;
  calibrating the camera rig to obtain at least an estimate of the focal length, radial distortion, and rotation matrix associated with each camera, and wherein
  the process action of mosaicing the selected frames to form the next frame of the panoramic video comprises a process action of employing at least the estimated focal length, radial distortion, and rotation matrix associated with each camera to assist in stitching the selected frames together.

9. The process of claim 4, further comprising the process actions of:
  following performing the action of mosaicing the selected frames to form said next frame of the panoramic video, computing a deghosting correction field that characterizes the local warping needed in each of the selected frames to reduce any double imaging or blurring associated with localized mis-registrations; and
  employing the computed deghosting correction field to reduce any double imaging or blurring in that frame of the panoramic video.

10. The process of claim 4, further comprising the process action of, following performing the action of mosaicing the selected frames to form said next frame of the panoramic video, adjusting the exposure of that panoramic video frame to reduce any exposure mismatch between the selected frames used to form the panoramic video frame.

11. The process of claim 1, further comprising the action of encoding the frames of the panoramic video so as to facilitate their transfer and viewing.

12. The process of claim 11, wherein the process action of encoding the frames of the panoramic video comprises an action of creating at least one data file comprising the series of texture maps associated with the frames of the panoramic video.

13. The process of claim 12, wherein the process action of creating at least one data file comprising the series of texture maps associated with the frames of the panoramic video, comprises an action of compressing the at least one data file.

14. The process of claim 12, wherein the process action of encoding the frames of the panoramic video further comprises an action of creating a master data file comprising pointers to said data files associated with the frames of the panoramic video and a definition of the prescribed environment model used to construct the texture maps for each frame of the panoramic video.

15. The process of claim 14, wherein the process action of creating the master data file further comprises an action of defining navigational boundaries associated with the frames of the panoramic video, wherein said navigational boundaries refer to what part of the environment model the texture maps associated with each frame of the panoramic video characterize.

16. The process of claim 14, wherein the process action of creating the master data file further comprises an action of including a pointer to a data file comprising at least one static texture map that characterizes portions of the environment model that are considered unchanging and not characterized by any of said texture maps associated with the frames of the panoramic video.

17. The process of claim 1, further comprising a process action of incorporating an audio track into the panoramic video.

18. A system for generating a panoramic video of a surrounding scene, comprising:
  a camera rig comprising multiple video cameras disposed so as to view different portions of the scene, but wherein the field of view of each camera overlaps that of each adjacent camera;
  a general purpose computing device; and
  a computer program comprising program modules executable by the computing device, wherein the computing device is directed by the program modules of the computer program to,
    input multiple videos of the scene, wherein each of said videos was captured using a separate one of the cameras of the camera rig,
    determine the relative frame offsets between all the cameras, wherein the frame offset between any pair of cameras is defined as the number of frames before or after a particular frame number of the video captured by one of the cameras and the frame number of a frame of the video captured by the other camera at approximately the same moment in time,
    mosaic individual frames of the videos which were captured at approximately the same moment in time, as determined using the relative frame offsets between the cameras, to form each frame of the panoramic video, locally warp each mosaiced video frame of each panoramic video frame to reduce any ghosting or blurring in the frame associated with localized mis-registrations, and construct a series of texture maps for each frame of the panoramic video, each of which coincides with a portion of a prescribed environment model of the scene.

19. The system of claim 18, wherein the camera rig further comprises a surface onto which the cameras are mounted, and wherein the optical axes of each camera are approximately coplanar and directed approximately radially outward from an axis extending normal to the mounting surface from a central point thereof.

20. The system of claim 18, wherein a sufficient number of cameras are employed in the camera rig to provide a full 360 degree coverage of the surrounding scene including the overlap in the field of view between each pair of adjacent cameras.

21. The system of claim 20, wherein as few cameras are employed in the camera rig as possible while still providing the full 360 degree coverage of the surrounding scene including the overlap in the field of view between each pair of adjacent cameras.

22. The system of claim 21, wherein each camera comprises a wide angle lens so as to increase its field of view, thereby allowing the use of fewer cameras than would be possible employing a standard, non-wide angle lens.

23. The system of claim 18, wherein the overlap in the field of view of each camera in relation to each camera adjacent thereto is at least approximately 20 percent.

24. The system of claim 18, wherein each of the cameras is set so as to record in a progressive scan mode at a frame rate of approximately 30 frames per second.

25. The system of claim 18, wherein the cameras are all adjusted to have approximately the same setting for zoom, focus, exposure, shutter speed, as well as being white balanced in approximately the same way and having any image stabilization feature deactivated.

26. The system of claim 19, further comprising a program module for calibrating the camera rig which is executed prior to executing the program module for inputting multiple videos of the scene, wherein the calibration module provides at least an estimate of the focal length, radial distortion, and rotation matrix associated with each camera, which are employed in the execution of the mosaicing module to assist in the creation of each frame of the panoramic video.

27. The system of claim 26, wherein the program module for calibrating the camera rig requires a calibration video captured by one of the cameras and calibration images captured by each of the cameras in order to estimate the focal length, radial distortion, and rotation matrix associated with each camera, and wherein the calibration video and calibration images are obtained in a pre-calibration procedure.

28. The system of claim 27, wherein the mounting surface is rotatable a full 360 degrees in at least one direction about a center of rotation approximately coinciding with said central point of the mounting surface.

29. The system of claim 26, wherein the program module for calibrating the camera rig is repeated whenever the camera rig is reconfigured or the camera settings are adjusted.

30. The system of claim 18, further comprising a program module for encoding the frames of the panoramic video by creating at least one data file comprising the series of texture maps associated with the frames of the panoramic video.

31. The system of claim 30, wherein the program module for encoding the frames of the panoramic video, comprises a sub-module for adding an audio component to each data file associated with each frame of the panoramic video to create an audio track for the panoramic video.

32. The system of claim 31, wherein the sub-module for adding an audio component to each data file comprises a sub-module for adding an audio component representing the sound occurring in the scene at the time the video frames used to construct the frame of the panoramic video associated with the data file were captured.

33. The system of claim 32, wherein the audio component representing the sound occurring in the scene is captured using just one of the cameras of the camera rig.

34. The system of claim 32, wherein the audio component representing the sound occurring in the scene is a compilation of the sound captured by more than one of the cameras of the camera rig.

35. The system of claim 30, wherein the program module for encoding the frames of the panoramic video, comprises a sub-module for adding an audio component to each data file, wherein the audio component comprises multiple audio data sets each of which represents sounds of the environment which would be heard by a person viewing a portion of the scene captured in the panoramic video.

36. The system of claim 35, wherein each audio data set is derived from a sound recording made by a separate one of the cameras of the camera rig, and wherein each audio data set represents sounds of the environment which would be heard by a person viewing a portion of the scene defined by the field of view of the camera recording the sounds.

37. The system of claim 36, wherein the sub-module for adding an audio component to each data file comprises a sub-module for assigning the audio data set associated with a particular portion of the scene to the series of texture maps associated that portion of the scene.

38. A computer-readable storage memory medium having computer-executable instructions stored thereon for generating a panoramic video of a scene, said computer-executable instructions comprising:

(a) acquiring multiple videos of the scene, wherein each of said videos was captured using a separate camera;

(b) selecting one of the videos and choosing a starting frame from the selected video;

(c) identifying the corresponding frame in each of the non-selected videos that was captured closest in time to the chosen starting frame, said identifying comprising determining the relative frame offsets between all the cameras, wherein the frame offset between any pair of cameras is defined as the number of frames before or after a particular frame number of the video captured by one of the cameras and the frame number of a frame of the video captured by the other camera at approximately the same moment in time;

(d) mosaicing the chosen starting frame and the identified corresponding frames to form the first frame of the panoramic video;

(e) locally warping each of the mosaiced video frames to reduce any ghosting or blurring in the first frame of the panoramic video associated with localized mis-registrations;

(f) constructing texture maps for the first frame of the panoramic video each of which coincides with a portion of a prescribed environment model of the scene;

(g) selecting a frame in one of the videos that was captured immediately after a frame used to form the last-produced frame of the panoramic video;

(h) selecting the corresponding frame in each of the other videos that was captured closest in time to the previously selected frame (i) mosaicing the selected frames to form a next frame of the panoramic video;

(j) constructing texture maps from the last-formed frame of the panoramic video, each of which coincides with a portion of the prescribed environment model of the scene; and (k) repeating instructions (g) through (j) until either the desired length panoramic video is generated or the last-produced frame of the panoramic video was formed using in part the last frame of one of the videos.

39. The computer-readable medium of claim 38, further comprising executing, following the execution of the program module for mosaicing the chosen starting frame and the identified corresponding frames of the videos to form the first frame of the panoramic video, an instruction for adjusting the exposure of the first panoramic video frame to reduce any exposure mismatch between the video frames used to form the first frame.

40. The computer-readable medium of claim 38, further comprising executing, following the execution of the program module for mosaicing the selected frames to form said next frame of the panoramic video, an instruction for locally warping each of said video frames to reduce any ghosting or blurring in that frame of the panoramic video associated with localized mis-registrations.

41. The computer-readable medium of claim 38, further comprising executing, following the execution of the program module for mosaicing the selected frames to form said next frame of the panoramic video, an instruction for adjusting the exposure of that panoramic video frame to reduce any exposure mismatch between the video frames used to form it.

42. The computer-readable medium of claim 38, further comprising an instruction for encoding the frames of the panoramic video so as to facilitate their transfer and viewing.

43. The computer-readable medium of claim 42, wherein the instruction for encoding the frames of the panoramic video comprises a sub-module for creating a master data file comprising at least one data element comprising the series of texture maps for each frame of the panoramic video, and a data element defining the prescribed environment model used to construct the texture maps for each frame of the panoramic video.

44. The computer-readable medium of claim 43, wherein the instruction sub-module for creating the master data file further comprises a sub-module for including a data element defining navigational boundaries associated with the frames of the panoramic video, wherein said navigational boundaries refer to what part of the environment model the texture maps associated with each frame of the panoramic video characterize.

45. The computer-readable medium of claim 43, wherein the instruction sub-module for creating the master data file further comprises a sub-module for including data elements comprising at least one static texture map that characterizes portions of the environment model that are considered unchanging and not characterized by any of said texture maps associated with the frames of the panoramic video.

* * * * *